United States Patent [19]

Pepicelli et al.

[11]  4,317,603
[45]  Mar. 2, 1982

[54] VIDEO STORAGE RACK

[75] Inventors: Pasquale L. Pepicelli, Chelmsford; Edward Yonkers, Newton, both of Mass.

[73] Assignee: Data Packaging Corporation, Cambridge, Mass.

[21] Appl. No.: 147,564

[22] Filed: May 8, 1980

[51] Int. Cl.³ .............................................. A47B 81/06
[52] U.S. Cl. ......................................... 312/9; 312/13; 206/387; 211/40
[58] Field of Search ..................... 312/8, 9, 10, 11, 12, 312/13, 14, 15; 211/40; 206/387

[56] References Cited

U.S. PATENT DOCUMENTS

| | | | |
|---|---|---|---|
| 1,119,431 | 12/1914 | Jones | 312/12 |
| 2,825,465 | 3/1958 | Burgo | 211/40 |
| 3,245,736 | 4/1966 | Douthit | 211/40 |
| 3,338,421 | 8/1967 | Lyman | 312/13 |
| 3,666,337 | 5/1972 | Sztorc | 312/10 |
| 3,909,088 | 9/1975 | Dennehey et al. | 312/12 |
| 3,969,007 | 7/1976 | Lowry | 206/387 |
| 4,239,109 | 12/1980 | Nielsen et al. | 312/13 |

FOREIGN PATENT DOCUMENTS

| | | | |
|---|---|---|---|
| 1954884 | 5/1971 | Fed. Rep. of Germany | 211/40 |
| 489237 | 7/1938 | United Kingdom | 312/13 |

Primary Examiner—Victor N. Sakran
Attorney, Agent, or Firm—Wolf, Greenfield & Sacks

[57]  ABSTRACT

A storage rack for video tape cartridges permitting storage of a plurality of cartridges in a close linear array and arranged for ease of individual selection. The rack is preferably constructed of plastic having an open front and internal divider walls sectioning the rack into closely adjacent cartridge compartments. The base of the rack has a rear section maintaining the cartridge normally in a rearwardly tilted position and a front section sloped forwardly so as to allow selection by rotating the cartridge to permit the cartridge bottom to be guided by the front section and at the same time tilted forwardly at its top end thus extending out of the rack.

10 Claims, 3 Drawing Figures

VIDEO STORAGE RACK

BACKGROUND OF THE INVENTION

The present invention relates in general to a storage rack or cabinet which in the disclosed embodiment is for the storage of a plurality of video tape cartridges or cassettes. However, the concepts of the invention may also be employed in constructing other types of storage racks or cabinets such as a storage rack for audio cassettes or cartridges. The present invention also pertains to a storage rack for video tape cartridges which are individually selectable and which are arranged in a close linear array. The front of the storage rack is preferably open.

There are various types of storage racks or cabinets presently known and adapted to store a plurality of cartridges or cassettes. However, these racks or cabinets are generally of relatively complex construction requiring a number of component parts usually employing separate selection means associated with each cartridge such as a selection of button, lever or the like. For example, see the audio cassette storage cabinet shown in U.S. Pat. No. 3,969,007. Although this prior art device is of relatively simple construction, it still requires the use of separate selection or actuation means associated with each storage cassette or storage cartridge.

Accordingly, one object of the present invention is to provide a storage rack or cabinet adapted for the storage of video tape cartridges and which is of simplified construction preferably molded in a single piece construction. In accordance with the invention, rather than having separate selection means associated with each cartridge, each cartridge is selected by means of a cartridge rotation or tilting.

Another object of the present invention is to provide a storage rack for video or audio tape cartridges or cassettes which is quite compact, enables relatively tight packing of the cartridges in the rack, and which can be molded relatively inexpensively. The cartridges are preferably held in a linear array and in accordance with the invention can be maintained in close adjacent position.

SUMMARY OF THE INVENTION

In accordance with the present invention there is provided a storage rack or storage cabinet which in the disclosed embodiment is for the storage of video tape cartridges. However, the concepts of the invention may also be embodied in a cabinet or the like for the storage of other objects such as video cartridges or cassettes or record albums. The storage rack comprises a housing that is open at its front having side, top and rear walls and a base. Means are provided in the housing preferably in the form of separate divider walls which divide the housing into separate compartments with each compartment extending front to rear of the housing and each for receiving a cartridge in an upright position. The rear wall is supported with at least a portion thereof tilted rearwardly at its top end and forming a rear support surface for the cartridge. This rear wall includes a top tilted section and a bottom recessed section with the bottom recessed section being formed by a lower wall. The base is defined by two walls joined by a pivot edge with the walls respectively defining front and rear support surfaces. The rear support surface of the base extends in a plane substantially orthogonally to the rear wall portion so that the cartridge is normally held at rest on the rear support surface. The front support surface of the base extends in a plane at an obtuse angle to the rear wall portion whereby the cartridge may be manually engaged for rotation about the pivot edge so that the cartridge can be moved from its rest position to a position where it is maintained on the front support surface with the cartridge thus partially extending at its top end out of the housing. The manual engagement is preferably at the lower end of the cartridge with the person engaging by pushing with the finger inwardly against the bottom front edge of the cartridge causing the cartridge to pivot or rotate about the pivot edge of the base, thus, urging the top edge of the cartridge out of the housing and out of the general plane of the remaining cartridges. The lower section of the rear wall also preferably extends in a direction substantially orthogonally to the plane of the base front support surface. Thus, the cartridge in its rest position engages the rear wall top section and the base rear support surface while in its selected position it engages the rear wall lower section and the base front support surface. Thus, in accordance with the invention the selection of a cartridge does not necessarily involve the use of any separate components associated with the housing but instead occurs by rotation of the cartridge by manual engagement therewith so as to cause a tilting of the cartridge out of the housing for ease in selection thereof.

BRIEF DESCRIPTION OF THE DRAWINGS

Numerous other objects, features and advantages of the invention should now become apparent upon a reading of the following detailed description taken in conjunction with the accompanying drawings, in which.

DETAILED DESCRIPTION

Figure 1:
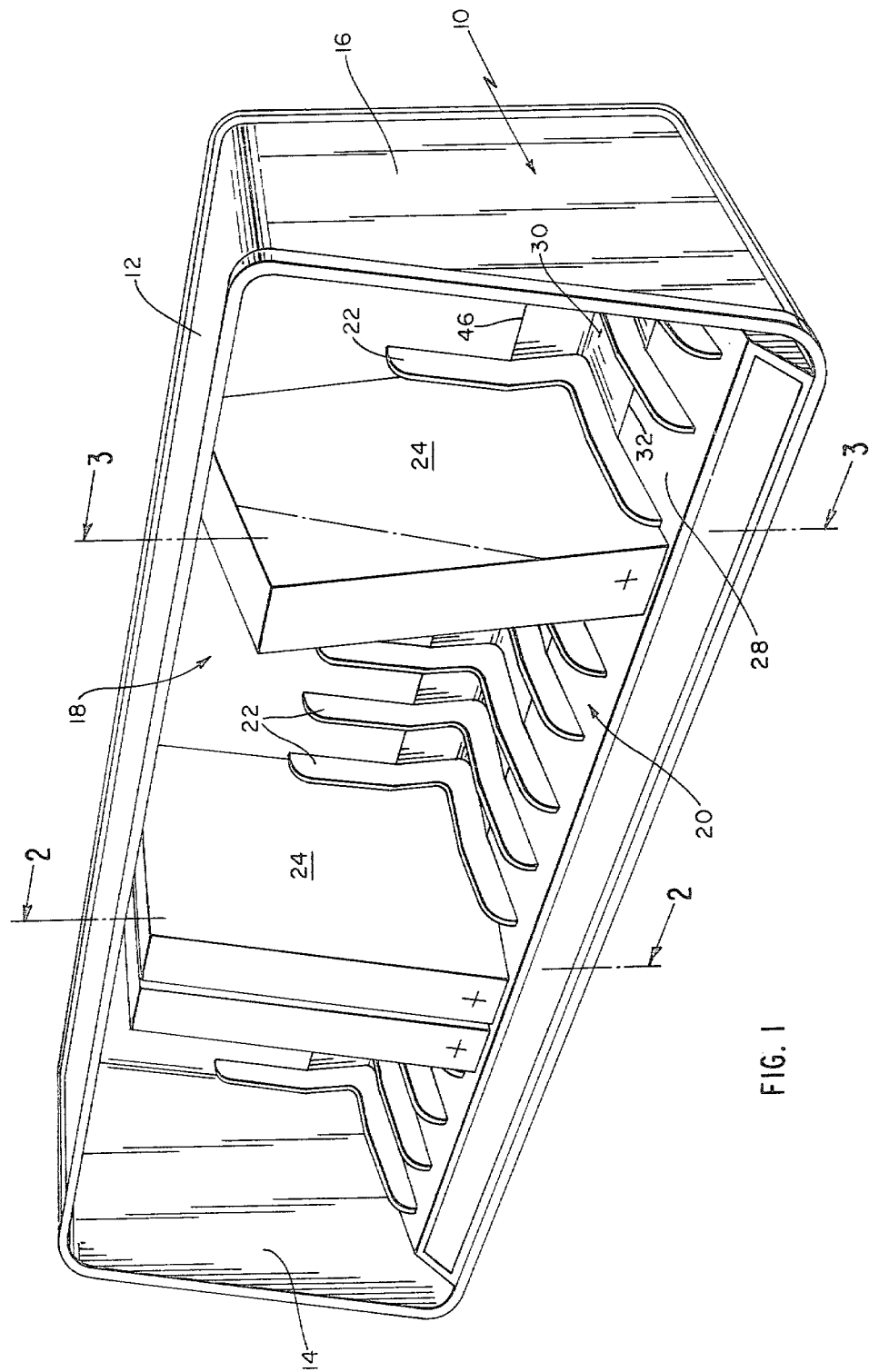
FIG. 1 is a perspective view showing a preferred embodiment of the storage rack of the present invention used for the storage of video tape cartridges.

FIG. 1 is a perspective view showing a preferred embodiment of a storage rack for the storage of video tape cartridges. This rack comprises a housing 10 that is preferably constructed in a single molded unit constructed of a hard plastic material. The housing 10 includes a top wall 12, end walls 14 and 16, rear wall 18, and base 20. The housing 10 is subdivided by means of partitioning walls 22 that extend vertically. These partitioning walls are of generally L-shape and are each relatively thin, thus, enabling the stacking of the cartridges 24 relatively close to each other. Because there are no separate selection mechanisms, the housing can be constructed relatively compactly. In FIG. 1 the two left-hand cartridges are shown in their rest position. Note also FIG. 2 which shows the same cartridges. The right-hand cartridge shown as FIG. 1 has been manually moved to its selection position. Note also FIG. 3 which shows the selected cartridge.

Figure 2:
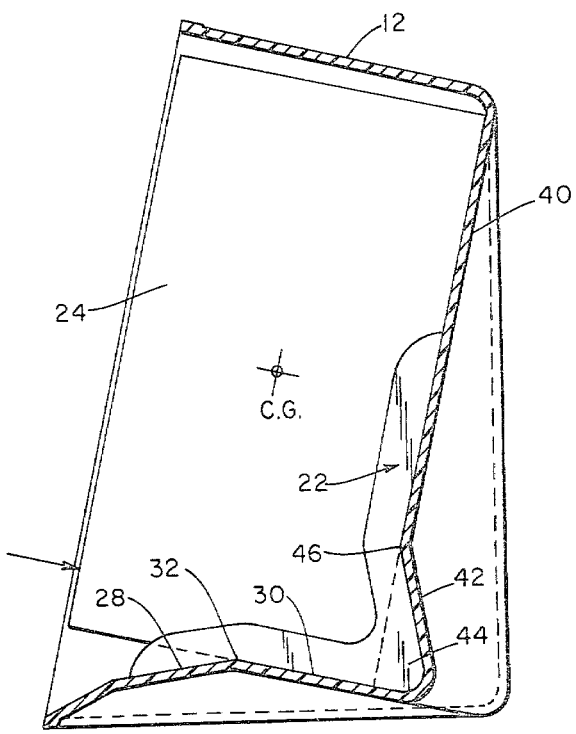
FIG. 2 is a cross-sectional view through the storage rack taken along line 2—2 of FIG. 1 and showing a cartridge in its normal at-rest position.
Figure 3:
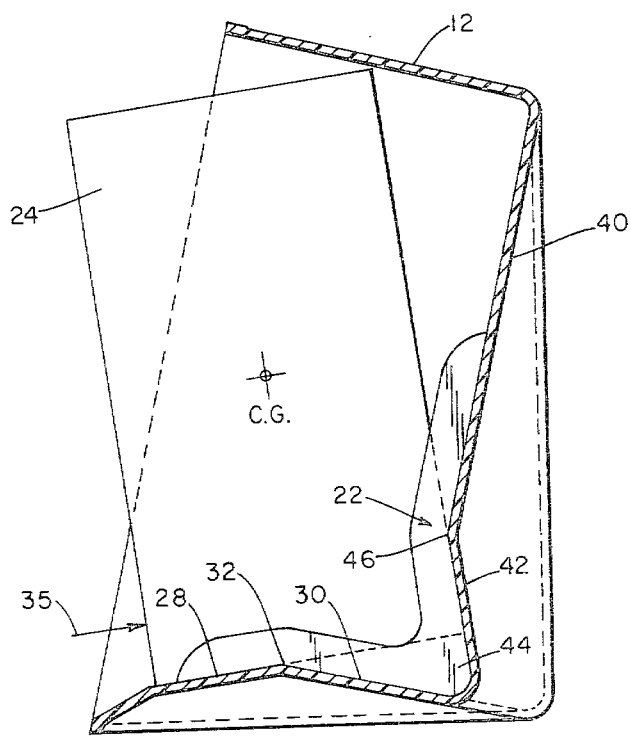
FIG. 3 is a further cross-sectional view similar to the one shown in FIG. 2, but taken along line 3—3 of FIG. 1 with another of the cartridges shown moved from its rest position to its selected position.

The manual selection in accordance with the invention without the need for separate selection mechanisms is possible primarily by virtue of the design of the base 20 and the rear wall 18. FIGS. 2 and 3 show the cross section of the base and rear wall. The base 20 includes a front support surface 28 and a rear support surface 30, both of which are planar and extend the entire width of the housing. Between these surfaces is defined the pivot edge 32. In moving the cartridge from the position of FIG. 2 to that of FIG. 3, the cartridge is actually tilted or rotated about the pivot edge 32. The movement to this selected position is by means of a manual force as indicated by the arrow 35 in FIG. 3 which moves the base of the cartridge rearwardly essentially pivoting the cartridge about the pivot edge 32, and at the same time altering the support at the rear surface of the cartridge.

The rear wall 18 includes an upper wall 40 and a lower wall 42. The wall 42 essentially defines a recess area 44 disposed rearwardly of the cartridge as viewed in FIG. 2. There is also a second pivot edge 46 defined between these upper and lower rear wall sections.

FIG. 2 shows the cartridge in a rest position, and if the rack of FIG. 1 is totally filled with cartridges, the front face of all cartridges are essentially in line and in the same plane as the face of the housing as depicted in FIG. 2. In this position it is difficult to select a cartridge unless the cartridge is moved to its selected position. FIG. 3 shows the cartridge having been moved from its rest position of FIG. 2 to its selected position. As indicated previously, this movement occurs by means of manual pressure applied in the direction and at the point of arrow 35 of FIG. 3. In moving between these two positions the cartridge actually moves and at the same time pivots about the edges 32 and 46. Thus, the pivot edge 32 forms a pivot for the lower surface of the cartridge with the cartridge not only pivoting at that edge but also moving rearwardly across the edge 32. Similarly, the rear surface of the cartridge 34 not only pivots about the edge 46 but also moves upwardly across the edge 46.

In order to provide this pivoting and sliding action for selection of the cartridge, it is preferred that certain of the walls be disposed at a right angle to each other. Thus, the wall 40 is in a direction so that it is at substantially a right angle to the base support surface 30. This is clearly shown in FIG. 2 with the rectangular cartridge being in rest on those two surfaces. Also, the wall 42 extends in a direction that is substantially at a right angle to the front support surface 28. In this regard note FIG. 3 and the placement of these surfaces in relation to the right angle surfaces of the cartridge.

Having described one preferred embodiment of the present invention, it should now be apparent that numerous other embodiments are contemplated as falling within the scope of this invention. For example, although the storage rack has been described in association with the storage of video cartridges, it may also be used for the storage of other items such as records or audio tape cassettes.

What is claimed is:

1. A storage rack for cartridge comprising:
   a housing open at the front and having a rear wall and a base,
   and means in the housing dividing the housing into separate compartments each extending front to rear of the housing and each for receiving a cartridge in an upright position,
   said rear wall supported with at least a portion thereof tilted rearwardly at its top end and forming a rear wall top support section for the cartridge and a rear wall lower section,
   said base having means defining front and rear support surfaces joined at a pivot edge,
   said base rear support surface extending in a plane substantially orthogonal to the rear wall top section whereby the cartridge is normally at rest on said rear support surface,
   and said base front support surface extending in a plane at an obtuse angle to the rear wall top section whereby the cartridge may be manually engaged for rotation about said pivot edge so that the cartridge rests on said base front support surface with the cartridge thus partially extending from the housing,
   said cartridge in the rest position engaging the rear wall top section and the base rear support surface, and in the selected position engaging the rear wall lower section and the base front support surface.

2. A storage rack as set forth in claim 1 wherein the rear wall bottom section is formed by a lower wall extending in a direction substantially orthogonally to the plane of the base front support surface.

3. A storage rack as set forth in claim 2 wherein the rear wall top section is substantially planar.

4. A storage rack as set forth in claim 1 wherein the housing has side walls and a top wall.

5. A storage rack as set forth in claim 1 wherein the dividing means includes separate walls between compartments.

6. A storage rack for cartridges or the like comprising; a housing open at the front having a rear wall and a base and adapted to receive the cartridges in a linear array, said rear wall supported with at least a portion thereof inclined rearwardly at its top end and forming a rear wall top support section against which the cartridge is adapted to rest in a rest position thereof, said base having means defining front and rear support surfaces joined at a pivot edge, said cartridge adapted to rest on said base rear support surface in the rest position thereof, the angle between the base front and rear support surfaces being greater than 180° whereby the cartridge may be manually engaged for rearward sliding movement across said pivot edge to move the cartridge to a selected position with the cartridge resting on said base front support surface with the cartridge thus partially extending out of the linear array of cartridges.

7. A storage rack as set forth in claim 6 wherein said rear wall has a stationary top support section and a stationary lower support section, said sections being disposed to form a rear pivot edge therebetween with an angle therebetween greater than 180°.

8. A storage rack as set forth in claim 6 wherein said rear wall top section extends in a plane substantially orthogonal to the base rear support surface, and said rear wall lower section extends in a plane substantially orthogonal to the base front support surface.

9. A storage rack for cartridges or the like comprising; a housing open at the front having a rear wall and a base and adapted to receive the cartridges in a linear array, said rear wall having stationary upper and lower support sections demarcated by a rear wall pivot edge, said base having means defining front and rear support surfaces demarcated by a base pivot edge, the cartridge adapted to rest on said base rear support surface in the rest position thereof, whereby the cartridge may be manually engaged for rearward sliding movement across said base pivot edge and upward sliding movement across said rear wall pivot edge to move the cartridge to a selected position with the cartridge then resting on said base front support surface with the cartridge thus partially extending at its top end out of the linear array of cartridges to enable easy selection thereof.

10. A storage rack for cartridges comprising;
a housing open at the front and having a rear wall and a base,
said cartridges being disposed in a linear array,
said rear wall supported with at least a portion thereof tilted rearwardly at its top end and forming a rear wall top support section for the cartridge and a rear wall lower section,
said base having means defining front and rear support surfaces joined at a pivot edge,
said base rear support surface extending in a plane substantially orthogonal to the rear wall top section whereby the cartridge is normally at rest on said rear support surface,
and said base front support surface extending in a plane at an obtuse angle to the rear wall top section whereby the cartridge may be manually engaged for rotation about said pivot edge so that the cartridge rests on said base front support surface with the cartridge thus partially extending from the linear array,
said cartridge in the rest position engaging the rear wall top section and the base rear support surface, and in the selected position engaging the rear wall lower section and the base front support surface.

* * * * *